(12) United States Patent
Reichmann et al.

(10) Patent No.: US 6,261,181 B1
(45) Date of Patent: Jul. 17, 2001

(54) DRIVE DEVICE FOR A MOTOR VEHICLE DOOR LOCK OR THE LIKE

(75) Inventors: Siegfried Reichmann, Wermelskirchen; Erwin Wolf, Weissach im Tal, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/297,098

(22) PCT Filed: Nov. 17, 1997

(86) PCT No.: PCT/DE97/02692

§ 371 Date: Jul. 13, 1999

§ 102(e) Date: Jul. 13, 1999

(87) PCT Pub. No.: WO98/22679

PCT Pub. Date: May 28, 1998

(30) Foreign Application Priority Data

Nov. 19, 1996 (DE) ............................................. 196 47 675
Nov. 29, 1996 (DE) ............................................. 196 49 548

(51) Int. Cl.[7] ................................................. F16D 31/08
(52) U.S. Cl. ........................ 464/24; 74/411; 192/58.3
(58) Field of Search .................................. 188/296, 293, 188/291; 192/58.3, 58.9; 74/425, 411, 89.14; 464/160, 24

(56) References Cited

U.S. PATENT DOCUMENTS

| | | | | |
|---|---|---|---|---|
| 1,540,453 | * | 6/1925 | Arave ................................. | 192/58.9 |
| 1,956,188 | * | 4/1934 | Black ................................. | 188/291 |
| 2,613,779 | * | 10/1952 | Milford ............................. | 192/58.9 |
| 3,220,640 | * | 11/1965 | Kambs ................................ | 464/24 |
| 4,160,389 | | 7/1979 | Kubono . | |
| 4,770,055 | * | 9/1988 | Chevance et al. .................... | 464/160 |
| 5,240,296 | * | 8/1993 | Kobayashi ........................... | 292/201 |
| 5,501,183 | * | 3/1996 | Takayama ............................ | 192/58.3 |
| 5,564,308 | * | 10/1996 | Hoshikawa et al. ................. | 74/89.14 |
| 5,860,501 | * | 1/1999 | Murata ................................ | 464/24 |

FOREIGN PATENT DOCUMENTS

| | | |
|---|---|---|
| 44 13 719 | 10/1995 | (DE) . |
| 0 064 942 | 11/1982 | (EP) . |
| 0 287 860 | 10/1988 | (EP) . |
| 2 026 592 | 2/1980 | (GB) . |
| WO 96 20353 | 7/1996 | (WO) . |

OTHER PUBLICATIONS

Patent Abstracts of Japan, vol. 97, No. 7, Jul. 31, 1997 & JP 09 088395 A (Aisin Seiki Co. Ltd.) Mar. 31, 1997—See Abstract.

* cited by examiner

Primary Examiner—Lynne H. Browne
Assistant Examiner—Kenn Thompson
(74) Attorney, Agent, or Firm—Nixon Peabody LLP; David S. Safran

(57) ABSTRACT

The invention relates to a drive device for a motor vehicle door lock or the like, which comprises a motor or in particular an electromotor drive and a gear unit (3) with a drive end and an output end. In order to optimize mechanical back-up actuation in the case of power failure or voltage drop or other interruption of the motor, in particular electromotor drive, according to the invention, between the drive end and the output end of the gear unit (3), is fitted a coupling (10) that is variable in coupling degree, which has a high degree of coupling in the case of high rotational speed, and a low degree of coupling in the case of low rotational speed.

13 Claims, 2 Drawing Sheets

DRIVE DEVICE FOR A MOTOR VEHICLE DOOR LOCK OR THE LIKE

BACKGROUND OF THE INVENTION

1. Field of the Invention

The invention relates to a drive means for a motor vehicle door lock or the like, but also to a motor vehicle rear hatch lock or rear door lock or tailgate lock, with an electric motor drive, a gearing having a drive side and a driven side, an actuating lever of a lock mechanism in driven connection with the gearing.

2. Description of Related Art

The known drive means for a motor vehicle door lock or the like has a simple structure and allows simple auxiliary actuation by hand when the electric motor drive fails U.S. Pat. No. 5,240,296). In this drive means the gearing is made as a worm gear pair with a worm and worm gear, projecting eccentrically from the worm gear in the axial direction a driving lug which fits into a fork-shaped receiver of an actuating lever and overthrows it into a safety or safety-released position. The driving lug is at rest outside the fork-shaped receiver so that then the actuating lever can be moved back and forth by hand between the safety and safety-released position. When the electric motor drive fails, therefore the lock can also be moved by hand into this rest position, i.e. for example, the safety can be engaged or released proceeding from a locking cylinder.

In this prior art stops for the safety position and the safety-released position are assigned to the actuating lever. Actual activation of the electric motor drive takes place by microswitches, not by striking these stops.

One problem in this drive means is the failure of electricity while the electric motor drive is running. Then it can happen that the driving lug on the worm gear remains within the fork-shaped receiver, is blocked there, and thus locks the entire door lock. Usually it is not possible to build the electric motor drive such that it does not self-lock in this situation, therefore can be reset by hand when the corresponding force is applied.

If the intention is to control the electric motor drive by so-called "block operation", i.e. by fixing the power consumption when the driving lug strikes the stop surfaces laterally from the fork-shaped receiver published German Patent Application No. 44 39 479), it is admittedly advantageous in terms of motor and control engineering, but the aforementioned problem of drive failure during operation is thus not solved. In addition, the impact when the driving lug strikes the stop surface is hard; this can lead to considerable wear and premature failure of the drive means and briefly cause the current to rise very dramatically (6 to 8 A). Making the corresponding stops elastic does not always help the situation published European Patent Application No. (0 684 356).

SUMMARY OF THE INVENTION

The object of the invention is to embody and develop a drive means of the aforementioned type such that when the current fails or the voltage drops, therefore the electric motor drive fails, and/or with high self-locking of the gearing, actuation by hand or from the outside can be done as easily and permanently reliably as possible. At the same time quiet, soft starting of the electric motor drive and contact as soft as possible in the block will be ensured when block operation is underway.

The aforementioned object is achieved in a drive means for a motor vehicle door lock or the like by a variable coupling being provided between the driven side of the gearing producing a high degree of coupling at high rpm and a low degree of coupling at low rpm, having low slip at high rpm and high slip at low rpm and being a fluid coupling with a fluid of relatively high viscosity in which a coupling part moves.

Differently than in the existing gearing of drive means of the type under consideration, there is no fixed coupling between the drive side and the driven side, but coupling which can vary in degree of coupling. Therefore, depending on the rpm the gearing has slip of varying amounts. At high rpm the slip is low, at low rpm relatively high slip can be accomplished. How high the slip is depends of course on the counterforce acting at the time. The teaching of the invention is especially important when the coupling characteristic of the coupling is independent of the direction in which the force flows.

With the teaching as claimed in the invention, auxiliary actuation of a drive means which is not a problem in any respect for a motor vehicle door lock or the like can be accomplished. When the motor, especially the electric motor drive, starts with relatively high rpm, the coupling works with a high degree of coupling and the slip of the gearing is low or almost zero. A flow of force is established from the drive side to the driven side. The actuating lever or whatever drive element which transfers the driving motion into the lock mechanism is driven as designed. If the motorized, especially the electric motor drive fails, for example the actuating lever coupled to the driven side can be slowly moved by hand, for example starting from the locking cylinder; this corresponds to a low rpm on the driven side of the gearing. The low degree of coupling which then prevails or the large slip leads to the fact that the electric motor drive can nevertheless be stationary.

Therefore emergency actuation or auxiliary actuation is accomplished in case of a current failure or a voltage drop or otherwise sluggish gearing without any problem.

Another advantage is that when the electric motor drive starts the degree of coupling rises as the rpm increases, therefore soft starting is accomplished. If control of the drive means is accomplished by "block operation", the contact of the corresponding driving lug or the like with the stop surface is greatly damped by the aforementioned coupling characteristic and the coupling acts like a stop damper.

In the following the invention is explained using only one embodiment.

DETAILED DESCRIPTION OF THE INVENTION

The drive means as claimed in the invention is intended for a motor vehicle door lock or the like. Accordingly this drive means is also intended for a motor vehicle tailgate lock, a motor vehicle rear hatch lock, or a motor vehicle rear door lock.

Figure 1:
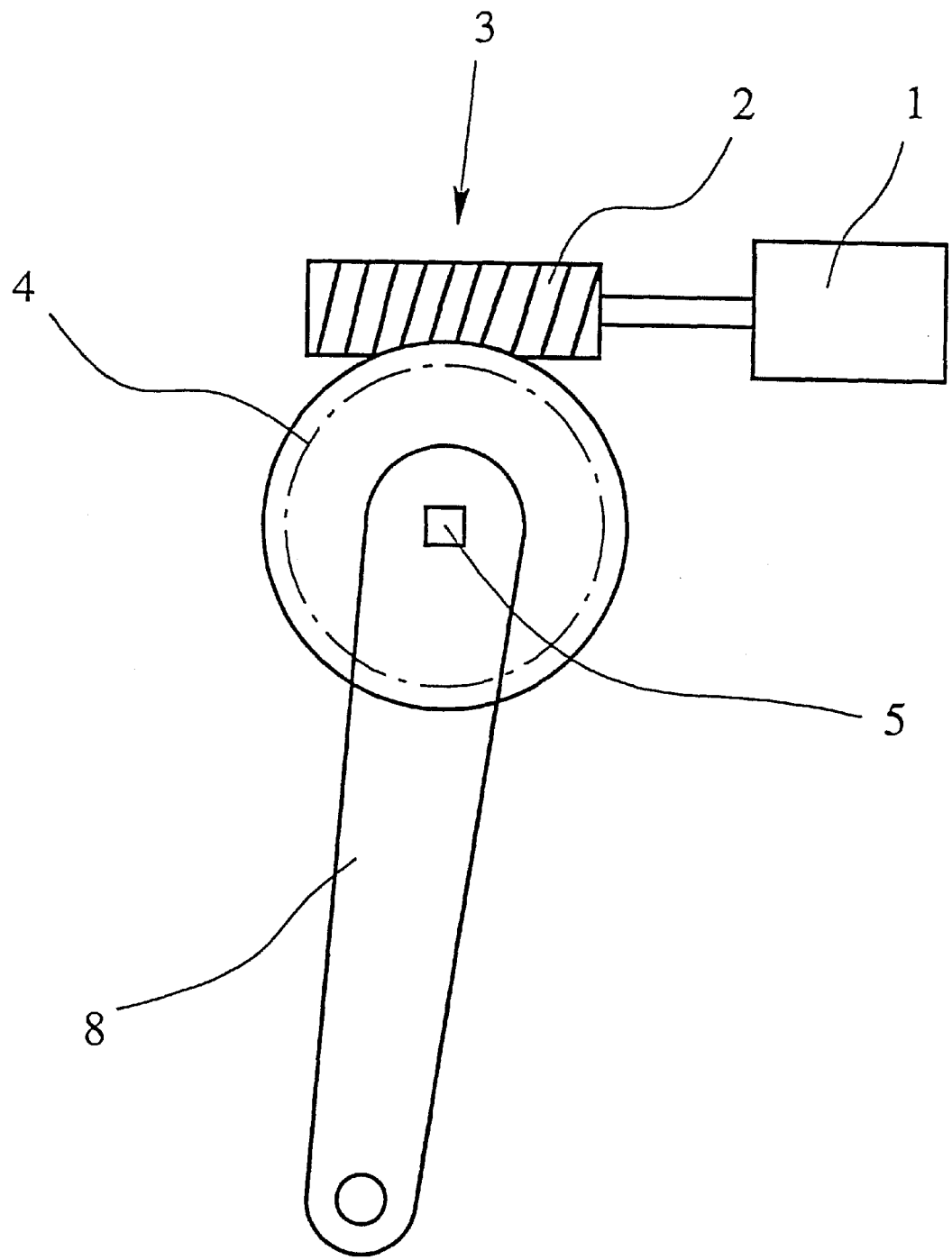
FIG. 1 shows a schematic of a drive means for a motor vehicle door lock or the like, FIG. 2 shows the area of the gearing of the drive means from FIG. 1 in a section which lies in the axial direction.

FIG. 1 shows in a schematic view one embodiment of a drive means as claimed in the invention. First of all it has a motorized, here electric motor drive 1. Generally the electric motor drive 1 is a fractional horsepower electric motor. Alternatively there are also hydraulic motors, pneumatic drives or the like.

The drive shaft of the electric motor drive 1 works on the worm 2 of gearing 3 made here as a worm gear pair. The worm 2 engages the peripheral gear rim of the worm gear 4 of the gearing 3. The gearing 3 in the embodiment shown is (largely) self-locking.

It is clear that the worm gear 4 drives a driver 5 which is made in this embodiment as a square lug coaxially to the worm gear 4. The driver 5 carries an actuating lever 8 which can be moved into a safety and a safety-released position by the operation of the drive 1. The motion of the actuating lever 8 is transferred into the lock mechanism of the motor vehicle door lock which is not detailed and there leads to the corresponding safety function or safety-released function. The operation of the actuating lever 8 in the lock mechanism can also be a different, for example, antitheft function which depends on the respective construction ofthe motor vehicle door lock, which is not relevant here.

The embodiment shown illustrates one version of the drive means in which the electric motor drive 1 is controlled in "block operation". The electric motor drive 1 is therefore turned on and off again by current supplied to the electric motor when the electric motor thus draws an overcurrent by the actuating lever 8 being blocked somehow mechanically in its further motion, for example by stops which can also be acting on the continuing levers of the lock mechanism.

The teaching of the invention is not limited to the operation of a drive means in the block mode. Rather the teaching can be used to special advantage with an electric motor drive 1 controlled by microswitches or by following of control cams.

Figure 2:
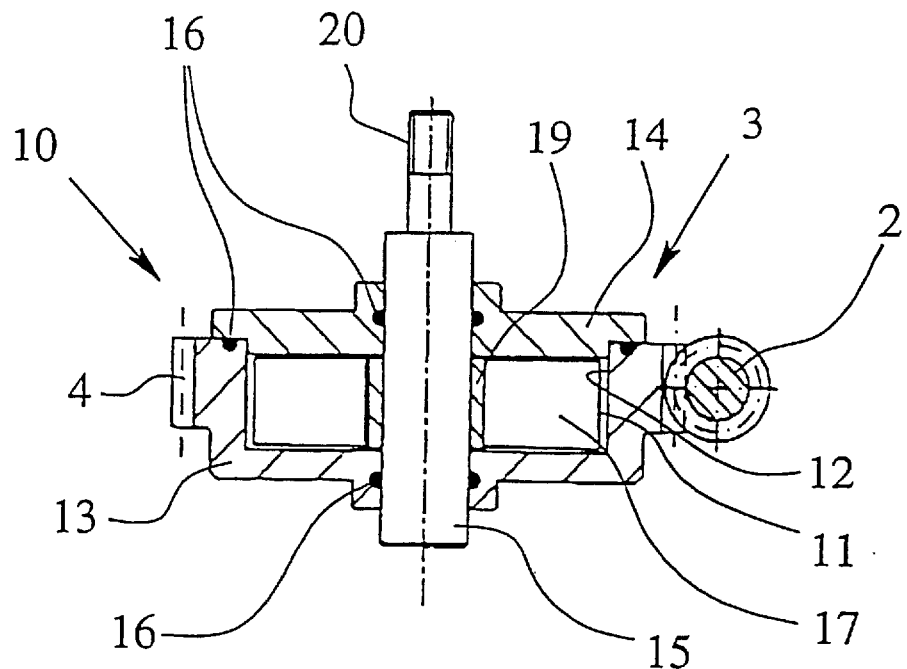

FIG. 2 shows the particularity of the teaching of the invention. The gearing 3 with the worm 2 and the worm gear 4, only in the embodiment, does not have a fixed coupling, but accomplishes a state in which between the drive side and the driven side of the gearing 3 there is a coupling 10 with variable degree of coupling, a high degree of coupling at high rpm and a low degree of coupling at low rpm. The embodiment shown is characterized especially by the coupling characteristic of the coupling 10 being independent of the direction in which the force flows.

Basically it would also be possible to work with a degree of coupling which is dependent on the direction in which the force flows, but then the object of the invention could only be partially achieved.

A coupling 10 which has a characteristic as claimed in the invention is for example a positive clutch which is coupled at high rpm and decoupled at low rpm. This positive coupling can be made for example as a centrifugal clutch.

The embodiment shown however illustrates the version ofthe coupling 10 accomplished as claimed in the invention in the drive means for a motor vehicle door lock in a non-positive manner, so that at high rpm the coupling 10 has low slip and at low rpm it has high slip. This can also be done with a centrifugal clutch when positive engagement of the centrifugal force components is not accomplished, but simply friction engagement.

The embodiment shown is characterized by one especially preferred embodiment of this non-positive coupling 10, specifically by the coupling 10 being made as a fluid coupling with a fluid of relatively high viscosity in which the coupling part moves. When the coupling part moves in the fluid, resistance is offered to this motion in the semiliquid fluid of relatively high viscosity and the resistance rises with the speed of the coupling part in the fluid. The faster the coupling part moves, the higher the rpm, the higher resistance to motion. The coupling part can be moved quite slowly in the fluid almost without resistance or with very low resistance. In this way a variable degree of coupling is achieved.

This embodiment is furthermore characterized by the fluid being pressed through a constriction 11 with a small flow cross section, preferably through several constrictions 11. The fluid is advantageously viscous, preferably with a viscosity greater than 50,000 (relative viscosity). For example a sticky viscous grease can be used which at 120° C. has a relative viscosity of 135,000 and at −40° C. a relative viscosity of 200,000.

FIG. 2 shows merely the gearing 3 of the drive means with the coupling 10 in an axial section. First, the worm 2 of the gearing 3 and the worm gear 4 are apparent. It is furthermore recognized that the coupling 10 has a first coupling part 13 which is made trough-like and which forms a receiving space 12 for the fluid, with a cover 14 which closes it, and a second coupling part 15 which projects axially to the outside at least to one side and which centrally penetrates the receiving space 12. Sealing elements 16 seal the cover 14 to the first coupling part 13 and the second coupling part 15 in the first coupling part 13 so that the fluid cannot escape from the receiving space 12.

For reasons of practical use the fluid should be a viscous material with properties as independent of temperature as possible, in any case in the range from 230 to roughly 390 K, therefore from roughly −40° C. to roughly 120° C. The seal between the cover 15 and the first coupling part 13 can also be made permanent, for example by ultrasonic welding of the two parts.

It is furthermore important that the second coupling part 15 has at least one, here preferably several blades 17 which project into the fluid in the receiving space 12. It is especially advantageous here that between the blades 17 and the wall and/or the bottom and/or the top of the receiving space 12 and/or the wall of the second coupling part 15 there are gaps which form constrictions 11. Alternatively or additionally the blades 17 can also be made with openings or holes to form the corresponding constrictions.

Figure 3:
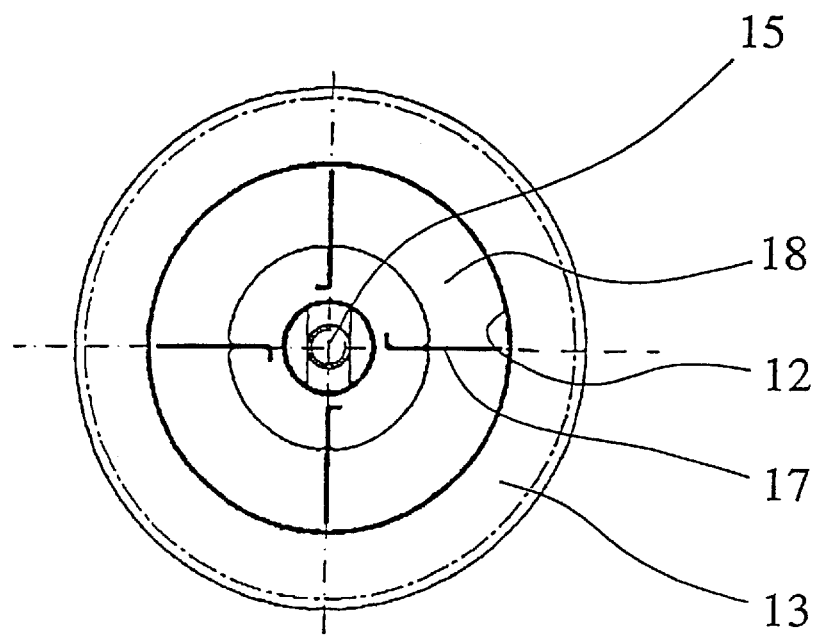
FIG. 3 shows in an overhead view the article from FIG. 2, but without the cover shown there.

In this embodiment the coupling 10 is built such that the second coupling part 15 has a round disk-shaped support plate 18 from which the blades 17 project roughly axially, their being themselves in turn aligned roughly radially. It is shown in FIG. 3 in the overhead view and in FIG. 2 that the support plate 18 which in the embodiment shown is made along with the blades 17 as an integral plastic part, is pressed against the second coupling part 15 made as a metal driven shaft by means of a sleeve 19 which is likewise an element of this plastic part. Here of course many other attachment techniques are possible, as are other materials. The blades 17 in the receiving space 12 can also be made as thin, for example 0.2 mm, metal sheets if the plastic blade should prove not to be resistive enough.

The embodiment shown illustrates the first coupling part 13 otherwise as the worm gear 4 and the second coupling part 15 as the aforementioned metal driven shaft. At the top on the driven shaft which forms the second coupling part 15 is the connecting end 20 on which then the driver disk 5 from FIG. 1 is placed. Of course, the connecting end 20 can also be connected in a quite different manner into the lock mechanism which requires structural considerations of one skilled in the art.

The heart of the invention lies in having made the coupling 10 which is dependent in degree of coupling on the rpm and which solves the problem of simple auxiliary actuation in case of current failure or voltage drop as well as the problem of smooth starting and a damped block stop in block operation.

If the worm 2 is driven by the electric motor drive 1 with high rpm, the fluid essentially cannot be pressed through the constrictions 11 in the receiving space. The blades 17 are entrained by the fluid and with them, also the second coupling part 15 which thus ultimately drives the actuating lever accordingly with the connecting end 20. If during this process the electric motor drive 1 is somehow stopped or blocked, first the actuating lever 8 cannot continue to move. But then this can be done by hand, therefore for example by the action of the locking cylinder of the lock itself directly on the actuating lever 8, when this actuating motion proceeds slowly, therefore only low rpm occur. Specifically then the blades 17 can move against the fluid in the receiving space 12, the fluid passes through the constrictions 11 and offers only low resistance to the very slowly moving blades 17. Emergency actuation or auxiliary actuation can therefore be done without problems.

It is apparent that the corresponding starting and stop damping is in the same way the cycle of this fluid coupling.

What is claimed is:

1. Drive means of a motor vehicle door lock comprising an electric motor drive, a gearing having a drive side and a driven side, an actuating lever of a lock mechanism in driven connection with the gearing, a variable coupling between the drive side and the driven side of the gearing which has high degree of coupling at high rpm and a low degree of coupling at low rpm, the coupling having low slip at high rpm and high slip at low rpm;

wherein the variable coupling is a fluid coupling with a fluid of high relative viscosity in which a coupling part moves.

2. Drive means as claimed in claim 1, further comprising at least one constriction of a small flow cross section through which the fluid is pressed.

3. Drive means as claimed in claim 2, wherein said at least one constriction is a plurality of constrictions.

4. Drive means as claimed in claim 2, wherein the fluid is viscous with a relative viscosity greater than 50,000 in a temperature range of 120° C. to −40° C.

5. Drive means as claimed in claim 2, wherein the fluid is viscous with a relative viscosity of about 100,000 to 200,000 in a temperature range of 120° C. to −40° C.

6. Drive means as claimed in claim 1, wherein the fluid is viscous with a relative viscosity greater than 50,000 in a temperature range of 120° C. to −40° C.

7. Drive means as claimed in claim 1, wherein the fluid is viscous with a relative viscosity of about 100,000 to 200,000 in a temperature range of 120° C. to −40° C.

8. Drive means as claimed in claim 1, wherein the coupling has a first coupling part which is trough-shaped and which forms a receiving space for the fluid, a cover which closes the first coupling part, and a second coupling part which projects axially outwardly to at least one side and which centrally penetrates the receiving space; and wherein the second coupling part has at least one blade which projects into the fluid in the receiving space.

9. Drive means as claimed in claim 8, wherein the second coupling part has a plurality of blades which project into the fluid in the receiving space.

10. Drive means as claimed in claim 8, wherein at least one gap exists between the at least one blade and a wall bounding the receiving space, said at least one gap forming at least one constriction of a small flow cross section through which the fluid is pressed.

11. Drive means as claimed in claim 8, wherein the at least one blade has openings which form constrictions of a small flow cross section through which the fluid is pressed.

12. Drive means as claimed in claim 8, wherein the second coupling part has a round disk-shaped support plate; and wherein the at least one blade longitudinally extends in a radial direction relative to the disk-shaped support plate and projects roughly axially from the disk-shaped support plate.

13. Drive means as claimed in claim 1, wherein a drive motor is connected to the drive side and wherein the coupling part is manually displace able at low rpm from the driven side of the coupling when the motor is rendered inoperative.

* * * * *